United States Patent
Browning, Jr. et al.

(10) Patent No.: US 11,200,477 B2
(45) Date of Patent: Dec. 14, 2021

(54) WEARABLE RFID DEVICE

(71) Applicants: Michael Browning, Jr., Grapevine, TX (US); Maria Teresa Diaz, Pasadena, TX (US)

(72) Inventors: Michael Browning, Jr., Grapevine, TX (US); Maria Teresa Diaz, Pasadena, TX (US)

(73) Assignee: UATP IP, LLC, Bedford, TX (US)

( * ) Notice: Subject to any disclaimer, the term of this patent is extended or adjusted under 35 U.S.C. 154(b) by 0 days.

(21) Appl. No.: 16/944,240

(22) Filed: Jul. 31, 2020

(65) Prior Publication Data

US 2021/0049438 A1 Feb. 18, 2021

Related U.S. Application Data

(60) Provisional application No. 62/880,698, filed on Jul. 31, 2019.

(51) Int. Cl.
*G06K 19/077* (2006.01)

(52) U.S. Cl.
CPC .............................. *G06K 19/07749* (2013.01)

(58) Field of Classification Search
CPC .................. G06K 19/07749; G06K 19/07762
See application file for complete search history.

(56) References Cited

U.S. PATENT DOCUMENTS

| | | | | |
|---|---|---|---|---|
| 6,510,988 | B1* | 1/2003 | Kraus | G06K 19/041 235/375 |
| 7,293,383 | B2* | 11/2007 | Fishman | A01K 11/00 40/633 |
| D823,841 | S * | 7/2018 | Marini | D14/238 |
| 10,395,160 | B2* | 8/2019 | Vera Manero | G08B 21/0202 |
| 2005/0108912 | A1* | 5/2005 | Bekker | A01K 11/006 40/633 |
| 2005/0235539 | A1* | 10/2005 | Story | G09F 3/005 40/633 |
| 2009/0143689 | A1* | 6/2009 | Berry | A63B 24/00 600/508 |
| 2016/0063777 | A1* | 3/2016 | Wooley | G07C 9/00944 340/5.61 |
| 2016/0078752 | A1* | 3/2016 | Vardi | G08B 13/2417 340/506 |

* cited by examiner

*Primary Examiner* — Sonji N Johnson
(74) *Attorney, Agent, or Firm* — Decker Jones, PC; Brian K. Yost

(57) ABSTRACT

The wearable RFID device comprises a wearable arrangement, such as a wristband, an RFID buckle containing an RFID circuit and fitting onto the wristband, and a cover or cap for the RFID buckle. The RFID buckle comprises at least one side wall and a bottom wall, a cavity located inside the buckle. The buckle comprises a band retainer slot adjacent to the bottom wall, the band retainer slot receiving a portion of the wristband, the RFID buckle being removably located on the wristband. The RFID circuit is located in the buckle cavity. The removable cover is located on the RFID buckle, the cover closing the cavity. The wearable arrangement bands, buckles and covers are interchangeable with one another.

6 Claims, 4 Drawing Sheets

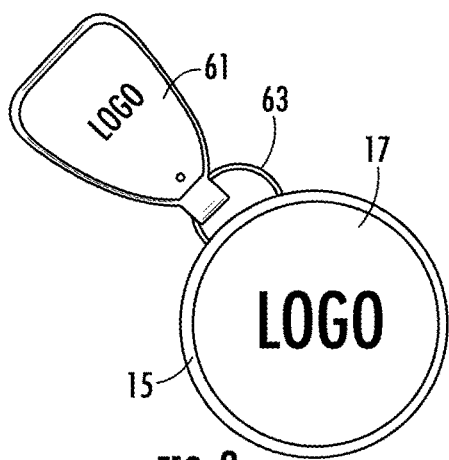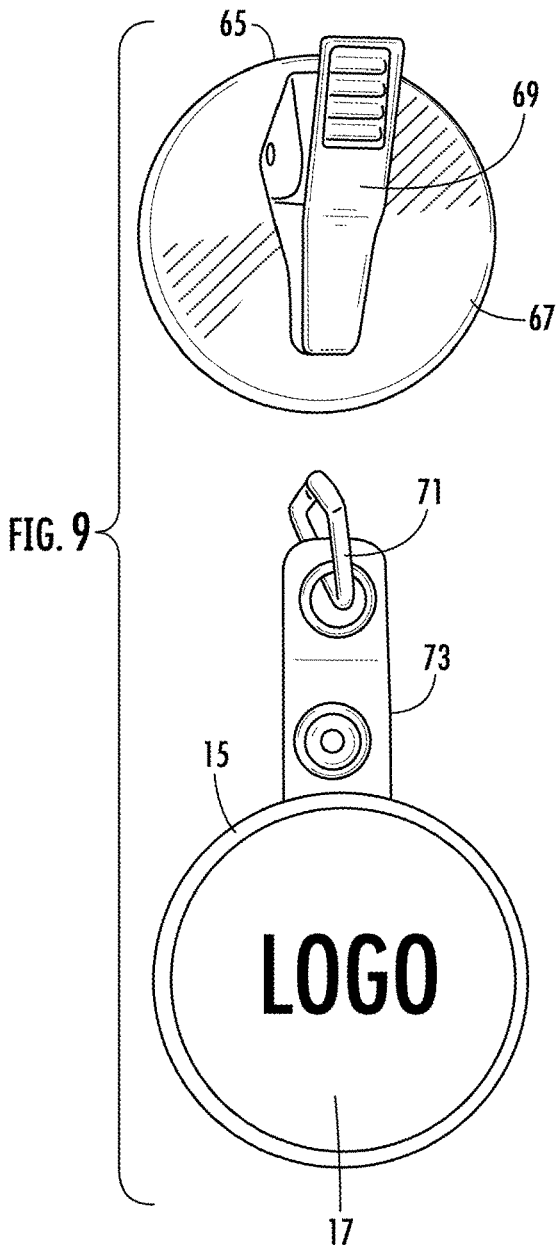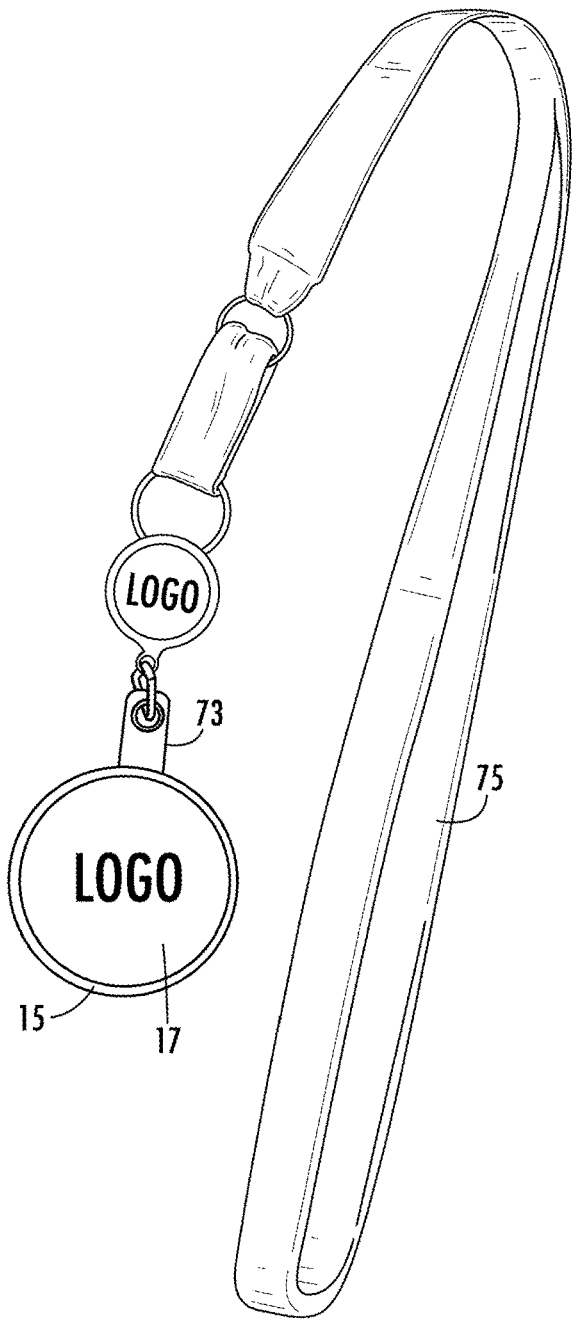

WEARABLE RFID DEVICE

This application claims the benefit of Provisional Application, Application No. 62/880,698, filed Jul. 31, 2019, which application is incorporated herein by reference.

FIELD OF THE INVENTION

The present invention relates to RFID (radio frequency identification) devices worn by human beings.

BACKGROUND OF THE INVENTION

RFID is in common use in a variety of applications. One use is to tag an object, such as a package, or box, with an RFID device. As the package leaves an area, such as a warehouse, scanners sense the exit of the package. A scanner transmits a radio frequency signal. The RFID is tuned to that frequency and "resonates" to transmit a reply signal. The scanner detects the reply signal and therefore the passage of the package. Coded information can be contained in the reply signal to uniquely identify the package and its contents.

The same RFID technology can be used in conjunction with people. This is particularly useful in applications such as interactive activities. For example, a user tagged with an RFID device can be tracked while engaged in an activity, such as playing a game on a field of play.

A common usage is for a user to wear an RFID device, such as in a pocket of clothing, or on a wristband. To gain access to an attraction, the RFID device is scanned. Once scanned and approved, the user can access the attraction. For example, in accessing a ski lift at a snow ski resort, RFID devices are used. As another example, RFID wristbands are used in some amusement parks. The RFID wristbands allow a user to access an attraction, and to purchase merchandise, food, etc.

There is a desire to allow customization of the appearance of RFID wristbands. A user may wish to wear a wristband that the user likes the appearance. In addition, a user may wish to change the appearance from time to time. In the prior art, the Disney Magic Band 2 provides an RFID disc that can be removed from the wristband. A collar on the inside of the band secures the RFID disc to the wristband with screws. The screws are first removed, followed by removing the collar and then removal of the RFID disc. The RFID disc can then be mounted into another type of holder, such as might be worn on a necklace, or clipped to a wheelchair. The Magic Band 2s are available in a number of different band designs and colors.

BRIEF DESCRIPTION OF THE DRAWINGS

FIG. 8 is the wearable RFID device, in accordance with another embodiment.

FIG. 9 is the wearable RFID device, in accordance with still another embodiment.

FIG. 10 is the wearable RFID device, in accordance with still another embodiment.

SUMMARY OF THE INVENTION

Figure 1:
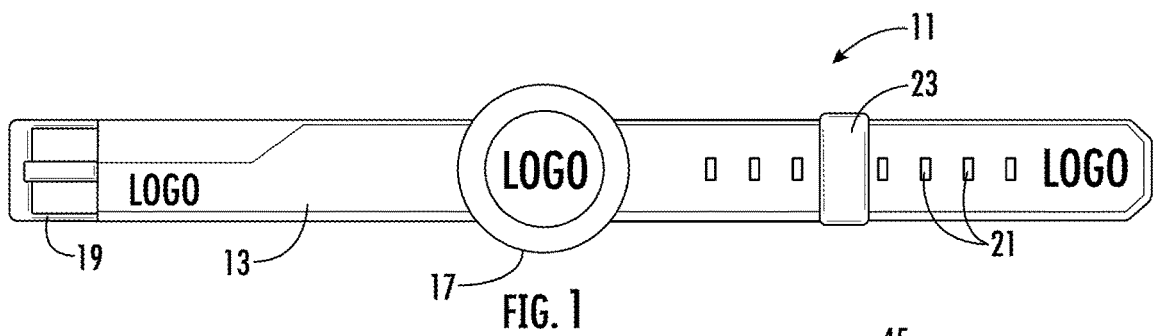
FIG. 1 is a top plan view of the wearable RFID device, in accordance with a preferred embodiment.

The wearable RFID device allows a user to wear an RFID circuit on the user's wrist as the user engages in various activities, such as at an amusement park or other venue. The RFID circuit is readable by various scanners located about the amusement park.

The wearable RFID device comprises a wearable arrangement, as a wristband, an RFID buckle containing the RFID circuit and fitting onto the wristband, and a cover or cap for the RFID buckle. There are provided a number, or collection, of wristbands, of buckles and of covers, each having a different design or graphics. A user can thus choose from a large number of combinations and mix and match the components to personalize the device. In addition, the user can create a personal collection of the various wearable arrangements, RFID buckles and covers. The wearable arrangement bands, buckles and covers are interchangeable with one another.

The collection of wristbands provides a variety of choices among designs. The wristbands can be of uniform construction, with different graphical designs and colors. In the preferred embodiment, each wristband is flexible and has a length, a width and a thickness. While the lengths can vary to allow different sizes for adults and children, the widths and thicknesses are uniform to allow the buckles to fit onto the bands. One end of the band has a tang type clasp. The other end portion is inserted into the tang type clasp and has holes for receiving the tang. The band can be provided with a keeper.

Other types of bands can be used. In particular, other types of closing devices, besides a tang and clasp, can be used. Examples include hook and loop fasteners, upstanding pin(s) received by a corresponding hole, etc.

Each RFID buckle is circular shaped and has a bottom wall and a circular side wall. A cavity is formed by the bottom and side walls. The cavity receives the RFID circuit, described in further detail below. A groove extends circumferentially around the outside of the side wall. The groove forms a lip for securing the cover.

Underneath the bottom wall is an arrangement for receiving the band. The arrangement is a flat ring that stands off from the bottom wall by a distance. The outside diameter of the ring is substantially the same as the outside diameter of the side wall. The ring has a central opening. The ring is connected to the bottom wall by supports. Each support is shaped like a "D" and has an outer rounded portion that forms part of the outer circumference of the buckle, and an inner straight portion. The straight portions, together with the bottom wall and the ring, form a channel for receiving the band. Slots are located in the outer circumference of the buckle, between the supports, and provide openings to the channel. Each support has a cavity therein. This reduces the weight of the buckle.

The buckles are available in various colors. Design elements can be provided as well, although the cover obscures the top of the buckle from view.

The RFID circuit has a chip that is conventional and commercially available. The RFID chip has a unique identifier. The user sets up the RFID chip by registering with an amusement park or other venue where the device can be used. Registration allows the RFID chip to be recognized as belonging to a particular user. The RFID chip is encased in a wafer-thin plastic, or other non-conductive, material to form the RFID circuit. The RFID circuit is water resistant and thin enough to allow insertion into the cavity. The band, the buckle and the cover are made of nonconductive material so as not to interfere with the operation of the RFID chip.

Because the RFID chip is unique and personal to the user, in the preferred embodiment, the RFID circuit is secured to the buckle to minimize the risk of loss. The RFID circuit is located in the cavity and may be glued in place. An optional cover sheet can be provided over the RFID circuit, which sheet is adhered in place.

The cover, or cap, has a top wall and a side wall. The side wall has an inner lip. The cover snap fits onto the RFID buckle. The inside diameter of the cover inner lip is slightly smaller than the outside diameter of the buckle lip. A tab is provided on the outer periphery of the cover for grasping.

To use, a user can construct a personalized device by selecting a particular wristband, a particular RFID buckle and a particular cover, all available from a collection that is offered. For example, the collection of wristbands may contain several designs, each with a different graphical design. Likewise, the collection may contain several RFID buckles and several covers, all of different designs.

The band is inserted into the backside of the buckle, through the slots. The band is then wrapped around the user's wrist and secured in place with the clasp. The cover snap fits to the buckle to remain securely in place.

In use, the user registers the RFID chip by locating the device by a reader. The reader is typically located at the amusement park or venue. The reader scans the RFID chip and prompts the user for input as to identification and other information such as payment (credit card information). Once registered, the user can access various attractions and events at the venue.

The user is able to change the appearance of the device. For example, the user can substitute a different cover on the RFID buckle. The user can also change out the band for another band. The user can continue to use the RFID capability of the RFID circuit. The user is able to collect a number of different bands and covers.

Although the wearable RFID device has been described as including a wristband, other embodiments have different wearable arrangements that allow wearing off of the wrist of the user. For example, the band can be lengthened to form a belt. Other embodiments use the RFID buckle and cover, such as a key fob. The fob can be carried in a pocket.

The RFID device may comprise a retractable lanyard. The lanyard line is stored in a housing which has a clip. A ring is connected to the housing. A snap strap extends through the ring and through a slot in the buckle and around the flat ring. The lanyard can be clipped to a shirt.

Other wearable arrangements can be used as well.

The foregoing disclosure and showings made in the drawings are merely illustrative of the principles of this invention and are not to be interpreted in a limiting sense.

DESCRIPTION OF THE PREFERRED EMBODIMENT

The wearable RFID device 11 shown in FIG. 1 allows a user to wear an RFID circuit on the user's wrist as the user engages in various activities, such as at an amusement park or other venue. The RFID circuit is readable by various scanners located about the amusement park.

The wearable RFID device 11 comprises a wearable arrangement, shown in FIG. 1 as a wristband 13, an RFID buckle 15 containing the RFID circuit and fitting onto the wristband, and a cover 17 or cap for the RFID buckle. There are provided a number, or collection, of wristbands, of buckles and of covers, each having a different design or graphics. A user can thus choose from a large number of combinations and mix and match the components to personalize the device 11. In addition, the user can create a personal collection of the various wearable arrangements, RFID buckles and covers. The wearable arrangement bands 13, buckles 15 and covers 17 are interchangeable with one another.

The various components will now be described referring to the drawings.

The collection of wristbands provides a variety of choices among designs. The wristbands can be of uniform construction, with different graphical designs and colors. In the preferred embodiment, each wristband 13 is flexible and has a length, a width and a thickness. While the lengths can vary to allow different sizes for adults and children, the widths and thicknesses are uniform to allow the buckles to fit onto the bands. One end of the band has a tang type clasp 19 (See FIG. 1). The other end portion is inserted into the tang type clasp and has holes 21 for receiving the tang. The band can be provided with a keeper 23.

Other types of bands can be used. In particular, other types of closing devices, besides a tang and clasp, can be used. Examples include hook and loop fasteners, upstanding pin(s) received by a corresponding hole, etc.

Figure 2:
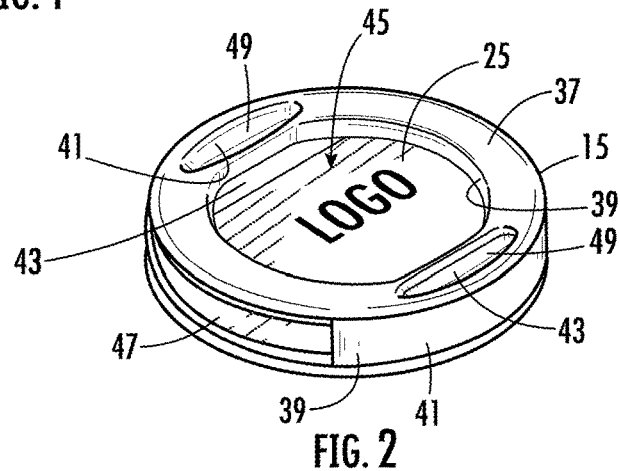
FIG. 2 is a perspective view of the underside of the RFID buckle.
Figure 3:
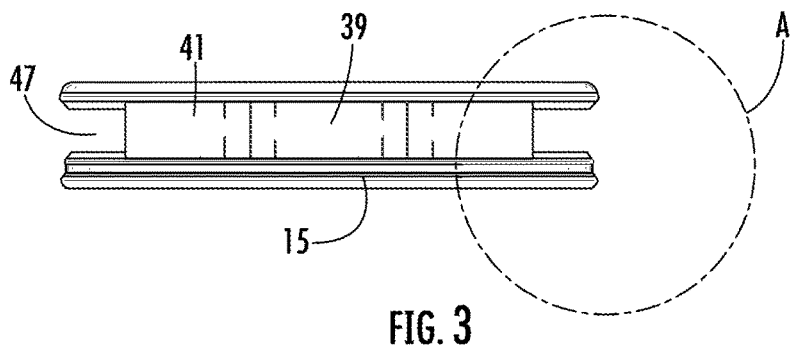
FIG. 3 is a side view of the RFID buckle, shown upside down.
Figure 7:
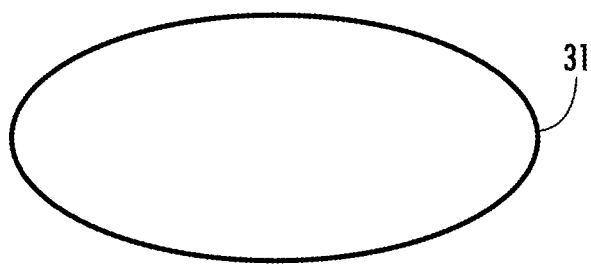
FIG. 7 is a perspective view of the RFID disc.

Referring to FIGS. 2 and 3, each RFID buckle 15 is circular shaped and has a bottom wall 25 and a circular side wall 27. A cavity 29 is formed by the bottom and side walls. The cavity 29 receives the RFID circuit 31 (see FIG. 7), described in further detail below. A groove 33 (see FIG. 4) extends circumferentially around the outside of the side wall 27. The groove forms a lip 35 for securing the cover 17.

Figure 4:
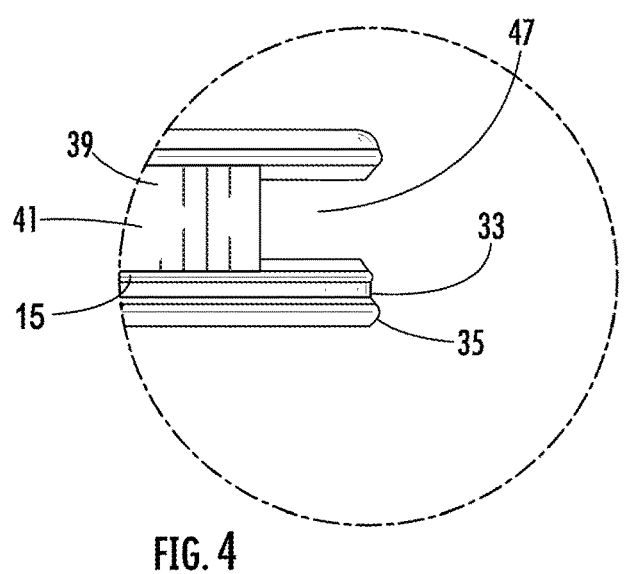
FIG. 4 is a detail view of the RFID buckle shown as "A" in FIG. 3.
Figure 5:
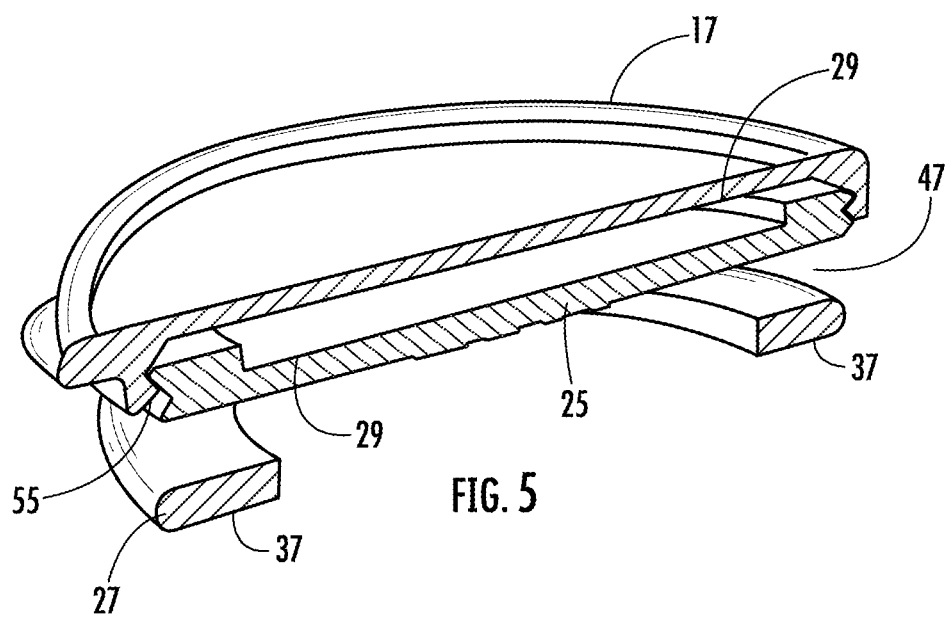
FIG. 5 is a cross-sectional view showing the fitting of the cap onto the buckle.

Underneath the bottom wall 25 is an arrangement for receiving the band. The arrangement is a flat ring 37 that stands off from the bottom wall by a distance. (FIGS. 2-4 show the RFID buckle as inverted, with the ring 37 above the bottom wall.) The outside diameter of the ring is substantially the same as the outside diameter of the side wall. The ring has a central opening 39. The ring 37 is connected to the bottom wall by supports 39. Each support is shaped like a "D" and has an outer rounded portion 41 that forms part of the outer circumference of the buckle, and an inner straight portion 43. The straight portions, together with the bottom wall and the ring, form a channel 45 for receiving the band. Slots 47 are located in the outer circumference of the buckle, between the supports, and provide openings to the channel. Each support has a cavity 49 therein. This reduces the weight of the buckle.

The buckles 15 are available in various colors. Design elements can be provided as well, although the cover 17 obscures the top of the buckle from view.

The RFID circuit 31 (see FIG. 7) has a chip that is conventional and commercially available. The RFID chip has a unique identifier. The user sets up the RFID chip by registering with an amusement park or other venue where the device can be used. Registration allows the RFID chip to be recognized as belonging to a particular user. The RFID chip is encased in a wafer thin plastic, or other non-conductive, material to form the RFID circuit. The RFID circuit is water resistant and thin enough to allow insertion into the cavity. The band 13, the buckle 15 and the cover 17 are made of nonconductive material so as not to interfere with the operation of the RFID chip.

Because the RFID chip is unique and personal to the user, in the preferred embodiment, the RFID circuit is secured to the buckle 15 to minimize the risk of loss. The RFID circuit 31 is located in the cavity 29 and may be glued in place. An optional cover sheet (not shown) can be provided over the RFID circuit, which sheet is adhered in place.

Figure 6:
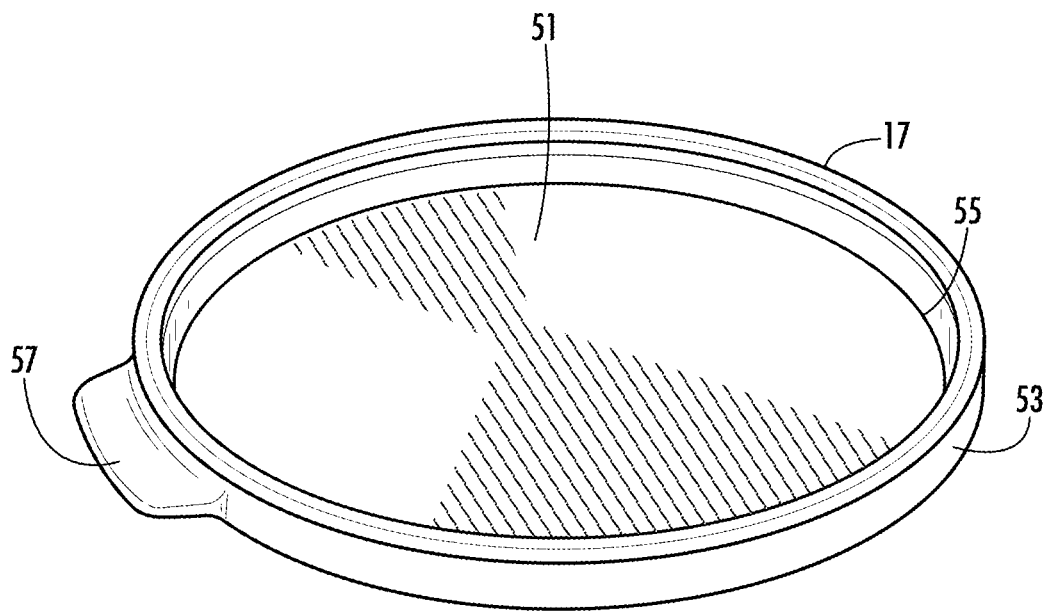
FIG. 6 is a perspective view of the underside of the cap.

The cover 17, or cap, has a top wall 51 and a side wall 53 (see FIG. 6 which shows the cover as inverted). The side wall has an inner lip 55. The cover 17 snap fits onto the RFID buckle 15. The inside diameter of the cover inner lip is slightly smaller than the outside diameter of the buckle lip. A tab 57 is provided on the outer periphery of the cover for grasping.

To use, a user can construct a personalized device by selecting a particular wristband 13, a particular RFID buckle 15 and a particular cover 17, all available from a collection that is offered. For example, the collection of wristbands 13 may contain several designs, each with a different graphical design. Likewise, the collection may contain several RFID buckles 15 and several covers 17, all of different designs.

The band 13 is inserted into the backside of the buckle 15, through the slots 47. The band 13 is then wrapped around the user's wrist and secured in place with the clasp 19. The cover 17 snap fits to the buckle 15 to remain securely in place.

In use, the user registers the RFID chip by locating the device by a reader. The reader is typically located at the amusement park or venue. The reader scans the RFID chip and prompts the user for input as to identification and other information such as payment (credit card information). Once registered, the user can access various attractions and events at the venue.

The user is able to change the appearance of the device. For example, the user can substitute a different cover 17 on the RFID buckle 15. The user can also change out the band 13 for another band. The user can continue to use the RFID capability of the RFID circuit. The user is able to collect a number of different bands 13 and covers 17.

Although the wearable RFID device has been described as including a wristband, other embodiments have different wearable arrangements that allow wearing off of the wrist of the user. For example, the band can be lengthened to form a belt. FIGS. 8-10 illustrate other embodiments, which use the RFID buckle 15 and cover 17.

FIG. 8 shows the RFID device with a key fob 61. The fob has a split ring 63, which ring is inserted on the flat ring 37 (see FIG. 2) in one of the slots 47 of the buckle 15. The fob 61 can be carried in a pocket.

FIG. 9 shows the RFID device with a retractable lanyard 65. The lanyard line is stored in a housing 67 which has a clip 69. A ring 71 is connected to the housing. A snap strap 73 extends through the ring and through a slot 47 in the buckle 15 and around the flat ring 37. The lanyard 65 can be clipped to a shirt.

FIG. 10 shows the RFID device with a necklace lanyard 75. The RFID buckle 15 is attached with the snap strap 73. The lanyard 75 is worn around the neck.

The figures show examples of various types of wearable arrangements 13, 61, 65, 75. Other wearable arrangements can be used as well.

The foregoing disclosure and showings made in the drawings are merely illustrative of the principles of this invention and are not to be interpreted in a limiting sense.

The invention claimed is:

1. A wearable RFID device, comprising:
    a) a wearable arrangement;
    b) an RFID buckle having a ring and a bottom wall, the ring and bottom wall being separated by a distance defined by first and second side supports, each of the first and second side supports being coupled to the ring and bottom wall;
    c) a cavity located inside the buckle, the RFID buckle having a band retainer slot defined by the bottom wall, the ring, and the first and second side supports;
    d) the band retainer slot receiving a portion of the wristband such that the wristband is threaded through the band retainer slot and such that the RFID buckle is slidingly and removably located on the wristband;
    e) an RFID circuit located in the buckle cavity;
    f) a removable cover located on the RFID buckle, the cover closing the cavity.

2. The wearable RFID apparatus of claim 1, wherein the cover has a first lip that engages a second lip on the buckle to secure the cover to the buckle.

3. The wearable RFID apparatus of claim 2, wherein the cover snap fits onto the buckle.

4. The wearable RFID apparatus of claim 1, wherein the wearable arrangement comprises a key fob.

5. The wearable RFID apparatus of claim 1, wherein the wearable arrangement comprises a lanyard.

6. A wearable RFID device assembly, comprising:
    a) plural wristbands;
    b) plural buckles, each buckle having a ring and a bottom wall, the ring and bottom wall being separated by a distance defined by first and second side supports, each of the first and second side supports being coupled to the ring and bottom wall;
    c) each buckle comprising a cavity located inside the buckle, each buckle having an RFID circuit located in the cavity;
    d) each buckle having a band retainer slot defined by the bottom wall, the ring, and the first and second side supports, the band retainer slot receiving a portion of the wristband, such that each of the buckles is structured and arranged for removeable and slidable positioning on each of the wristbands;
    e) plural covers, each cover being adapted for removeable positioning on each of the buckles opposite to the respective bottom wall.

\* \* \* \* \*